(12) United States Patent
Pham-Huu et al.

(10) Patent No.: US 7,988,861 B2
(45) Date of Patent: Aug. 2, 2011

(54) MATERIALS BASED ON TANGLED NANOTUBES OR NANOFIBRES, PREPARATION METHOD THEREOF AND USE OF SAME

(75) Inventors: Cuong Pham-Huu, Saverne (FR); Marc-Jacques Ledoux, Strasbourg (FR); Dominique Begin, Achenheim (FR); Patrick Nguyen, Strasbourg (FR); Julien Amadou, Montpellier (FR); Jean-Philippe Tessonnier, Hangenbieten (FR)

(73) Assignees: Centre National de la Recherche Scientifique (C.N.R.S.), Paris (FR); Universite Louis Pasteur, Strasbourg (FR)

( * ) Notice: Subject to any disclaimer, the term of this patent is extended or adjusted under 35 U.S.C. 154(b) by 816 days.

(21) Appl. No.: 11/883,644

(22) PCT Filed: Feb. 1, 2006

(86) PCT No.: PCT/FR2006/000223
§ 371 (c)(1), (2), (4) Date: Dec. 7, 2007

(87) PCT Pub. No.: WO2006/082311
PCT Pub. Date: Aug. 10, 2006

(65) Prior Publication Data
US 2008/0156733 A1    Jul. 3, 2008

(30) Foreign Application Priority Data

Feb. 3, 2005 (FR) ................................. 05 01105

(51) Int. Cl.
*C02F 1/78* (2006.01)
(52) U.S. Cl. .................................... 210/690; 210/192
(58) Field of Classification Search ............. 210/690, 210/192
See application file for complete search history.

(56) References Cited

U.S. PATENT DOCUMENTS

| 5,458,784 A | 10/1995 | Baker et al. |
| 2003/0211028 A1 | 11/2003 | Smalley et al. |
| 2005/0103990 A1 | 5/2005 | Pham-Huu et al. |

FOREIGN PATENT DOCUMENTS

WO    03/048039 A2    6/2003

OTHER PUBLICATIONS

Cheng et al., "Long Bundles of Aligned Carbon Nanofibers Obtained by Vertical Floating Catalyst Method," Materials Chem. and Phys., vol. 87, No. 2-3, pp. 241-245 (Oct. 15, 2004).
Gulino et al., "C2H6 as an Active Carbon Source for a Large Scale Synthesis of Carbon Nanotubes by Chemical Vapour Deposition," Applied Catalysts A, vol. 279, No. 1-2, p. 89-97 (Jan. 28, 2005).

*Primary Examiner* — Chester T Barry
(74) *Attorney, Agent, or Firm* — Young & Thompson

(57) ABSTRACT

A method of preparing a solid material based on tangled nanotubes and/or nanofibers, includes a step of growing carbon nanofibers and/or nanotubes with restraint in a contained reactor; and the materials thus obtained. The different uses of the materials are also disclosed.

25 Claims, 3 Drawing Sheets

MATERIALS BASED ON TANGLED NANOTUBES OR NANOFIBRES, PREPARATION METHOD THEREOF AND USE OF SAME

BACKGROUND OF THE INVENTION

1. Field of the Invention

This invention relates to nanostructured materials based on carbon nanofibres and/or nanotubes.

2. Description of the Related Art

Carbon nanofibres and nanotubes are materials which are well known in the state of the art. By "carbon nanofibre or nanotube" is meant for the purposes of this description a tubular carbon-based structure which is generally essentially based on carbon in the form of sheets of graphene having diameters of between 2 and 200 nm (dimensions which can be measured in particular from electron microscope images). These compounds belong to the family known as "nanostructured materials" which have at least one characteristic dimension of the order of a nanometer.

There are many types of carbon nanofibres and nanotubes of this kind, such as nanofibres comprising stacks of flat graphene sheets (known as "stacks") or "cones", or else carbon nanotubes, which are hollow cylindrical structures based on sheets of graphene rolled on themselves, a same nanotube often comprising several concentric cylinders based on graphene. These materials are generally obtained by progressive growth on metal catalysts in dispersed form, especially by the so-called process of "vapour deposition", which comprises placing a gas containing a carbon source into contact with a catalyst based on a transition metal which is in the metallic state, in the powder state, or which is supported. For more details concerning these materials and their manner of synthesis reference may be made in particular to the articles "Nanotubes from carbon" by P. M. Ajayan (Chem. Rev., vol. 99, p. 1787, 1999) and "Carbon nanofibers: catalytic synthesis and applications" by K. de Jong and J. W. Geus (Catal. Rev. Sci. Eng., vol. 42, p. 481, 2000).

As a general rule, whatever their precise structure may be, nanostructured materials of the carbon nanofibres and nanotubes type have very useful physical and chemical properties.

Normally, carbon nanofibres and nanotubes generally have a relatively high specific surface area associated with good intrinsic mechanical strength, which makes them substrates of choice, especially for the deposition of catalytic species.

Furthermore, given their nanometric dimensions, carbon nanotubes and nanofibres very often have intrinsic properties which are useful in catalysis. In particular, it is known from the article "Mesoporous carbon nanotubes for use as support in catalysis and as nanosized reactors for one-dimensional inorganic material synthesis" (Appl. Catal. A, 254, 345, 2003), that carbon nanotubes behave as "nanoreactors", their internal space defining a specific environment wherein the conditions under which chemical reactions take place are modified. In fact the internal diameter of a nanotube is generally of the order of 1 to 100 nm, which creates a space in which the conditions under which chemical species meet can be channeled and optimised. Thus, the use of nanotubes makes it possible to achieve high yields at ambient temperature and atmospheric pressure in reactions which under conventional conditions would require the use of higher temperatures and/or pressures. In this context, nanotubes can especially be used to catalyse Friedel-Crafts reactions, or again reactions for the desulphurisation of effluents containing $H_2S$, for example the final desulphurisation of effluents from the petroleum industry. In that respect reference may be made to the article "Carbon nanotubes as nanosized reactor for the selective oxidation of $H_2S$ into elemental sulphur" (Catal. Today, 91-92, 91, 2004).

Nevertheless, apart from these various advantages, nanostructured compounds based on carbon nanotubes or nanofibres are very frequently of very small size, which makes them very difficult to handle and control.

Especially carbon nanotubes and nanofibres have a very strong tendency to dusting, which is particularly likely to give rise to environmental and safety problems, in view of the high reactivity of the carbon nanotubes and nanofibres.

In addition, it should further be noted that, because of their very small size, carbon nanotubes and nanofibres are generally not filterable. It is therefore difficult to decontaminate air containing them in dust form. It is also difficult to recover catalysts based on carbon nanotubes and nanotubes after they have been used in a liquid medium, for example at the end of reactions in reactors of the stirred bed type.

Moreover, the small size of carbon nanotubes and nanofibres also prevents their use in reactors of the fixed bed type, particularly because of problems of loss of head.

For all these reasons, in practice, carbon nanotubes and nanofibres find little employment per se as catalysts or supports for catalysts in industrial processes.

In order to overcome the aforesaid disadvantages of carbon nanofibres and nanotubes, namely the difficulty of shaping them, the dust to which they give rise and the difficulty of using them in reactors of the fixed or stirred bed type, one solution, which has been especially suggested in application WO 03/048039, comprises immobilising these nanofibres and nanotubes on supports, for example on beads, felts, fibres, foams, extrusions, solid blocks or pellets.

This solution is certainly useful, but it requires the use of a carrier substrate, which is generally inactive in terms of catalysis. Thus in materials of the type of those described in WO 03/048039, the mass of the carrier substrate may represent up to 90% of the total mass of the material, which reduces the overall effectiveness of the material in relation to its total mass. In addition to this phenomenon of diluting catalytic activity, the presence of the carrier substrate very often means that, in the case of nanotubes, one of the inlets of the tube is not available since it is connected to the carrier substrate. Therefore, only one of the inlet to each of the nanotubes is available, which limits the catalytic efficiency of each nanotube and therefore again reduces the overall catalytic efficiency of the material.

SUMMARY OF THE INVENTION

One aim of the instant invention is to provide carbon nanofibres and/or nanotubes in a form having the advantages of supported nanofibres and/or nanotubes, but not their disadvantages, namely in a form wherein the carbon nanofibres and/or nanotubes can be easily controlled and handled while retaining their intrinsic catalytic activity and their ability to act as a substrate for active phases in catalysis.

To this end, one subject matter of the invention is a process allowing to prepare a solid material based on tangled nanofibres and/or nanotubes. This process comprises a step wherein carbon nanotubes and/or nanofibres are caused to grow under constraint within a confined reactor.

By "confined reactor" is meant for the purposes of this description a reactor within which carbon nanotubes and/or nanofibres are held during their growth stage. To this end, the reactor implemented in the process of the invention is provided with means capable of preventing nanotubes and/or nanofibres from leaving the reactor during growth.

Nanotubes and/or nanofibres are confined in the reactor during growth so that growth of the carbon nanotubes and nanofibres takes place under constraint. By "growth under constraint" is meant here a growth of carbon nanofibres and nanotubes which is carried on until the walls of the reactor prevent the growth of these nanotubes or nanofibres, that is to say until the growing nanotubes or nanofibres apply a pressure against the reactor walls, the material then occupying most of the space within the reactor.

Wholly surprisingly the inventors have now shown that carrying out a process of growing carbon nanotubes and/or nanofibres under confined conditions and with growth under constraint, as defined above, leads to carbon nanotubes and/or nanofibres which retain their initial intrinsic properties but which are tangled, in such a way that they lead to the formation of an agglomerated solid, generally a single block, in which the nanotubes and/or nanofibres are essentially bound together.

Thus, growth under constraint according to the invention leads to the obtention of a material of the moulded type, based on carbon nanotubes and/or nanofibres which has the shape of the internal space of the reactor used. This material has macroscopic dimensions (generally dimensions of at least the order of a millimeter, and very often of the order of a centimeter, or more), and it is therefore easier to handle and control than nanofibres and nanotubes in the isolated state. Nevertheless, the solid obtained retains the useful intrinsic properties of its constituent nanofibres and nanotubes, especially their high specific surface area, their high mechanical strength and their ability to act as a support for catalytic phases.

Especially, in the case of nanotubes, the macroscopic material retains intact nanotubes within its structure which are essentially all open at each of their two ends and thus have an available internal space which can play an effective part as a nanoreactor, especially for a catalysis.

Typically the process according to the invention comprises the following successive steps:
(a) carbon nanotubes and/or nanofibres are caused to grow within the confined reactor, until the nanotubes and/or nanofibres formed occupy the essential of the internal space within the reactor, and
(b) growth of the nanotubes and/or nanofibres under constraint is continued, whereby the material in formation applies pressure to the walls of the reactor.

As a general rule, the nanotubes and/or nanofibres become more effectively solidified when the duration of the step (b) increases, since growth under constraint generally results in increasingly complex tangling over the course of time.

In this connection, it should however be noted that, in parallel, the pressure applied on the reactor increases as the level of solid formation increases. In fact, as the nanotubes and nanofibres intrinsically have very good mechanical strength, their growth under constraint as in the process according to the invention produces very high pressures on the walls of the reactor used, and more generally on all the means used to confine the solid as it forms within the reactor.

Therefore, the level of solid formation ultimately achieved by the material is generally limited by the pressure resistance of the reactor used. It is therefore preferred to make use of reactors having walls which are very resistant to pressure, for example reactors having quartz walls, with a thickness advantageously at least 1 mm, and preferably between 2 and 10 mm, for example of the order of 4 mm. Likewise it is advantageous that the means ensuring confinement of the solid as it forms within the reactor is as resistant as possible to the pressure exerted.

Furthermore, it is advantageous, especially so as to permit removal of the synthesised material in the form of a single block, to carry out the process according to the invention within a reactor of cylindrical shape. In this context, in order to make easier the removal of the material obtained, it is advantageous that the process according to the invention includes a step (c) wherein the material obtained following growth under constraint is wetted by a solvent, preferably water, and the wetted material so obtained is then allowed to dry, generally between 30 and 80° C., typically at 50° C., preferably in a flow of air. The use of this step (c) leads to a contraction of the material which is generally isotropic, which makes it easier to turn the material out from the reactor. Furthermore, in most cases, the solid obtained after the aforesaid stage (c) has improved mechanical integrity and a higher bulk density.

In accordance with an advantageous embodiment, the process according to the invention is carried out by growing carbon nanotubes and nanofibres within a reactor using the process known as "vapour deposition", namely by placing a catalyst based on a transition metal in a divided state into the reactor and injecting into the reactor a gaseous medium comprising a carbon source from which the nanotubes and/or nanofibres form on the catalyst.

This process of synthesising nanofibres and/or nanotubes by vapour deposition, as well as the conditions under which it takes place, are well known in the state of the art, in particular from the articles "*Nanotubes from carbon*" (Chem. Rev., 99, 1787, 1999) and "*Carbon nanofibers: catalytic synthesis and applications*" (Catal. Rev. Sci. Eng., 42, 481, 2000). In this context it is in particular known that under the conditions of synthesis used in the vapour deposition process different types of nanotubes or nanofibres can be obtained, for example hollow tubes which may possibly be formed of several concentric tubes of different diameter, or solid fibres.

When the process according to the invention is carried out using the vapour deposition process, the catalyst used is preferably based on a transition metal, preferably selected from Fe, Ni, Co, Mo and mixtures of two or more of these metals, and possibly other metals. In this context the transition metal is preferably used:

in the form of a powder, having advantageously a particle size of between a few micrometers and several hundred micrometers, preferably between 10 and 100 micrometers, or in a divided state deposited on the surface of a solid carrier, such as a carrier based on alumina or silica. In this case the solid substrate which has been previously impregnated with an aqueous solution of a transition metal salt and then calcined and reduced to form an active phase based on the transition metal in the metallic state on the surface of the substrate can advantageously be used as a catalyst. In the case of catalysts of this type the supported metal species generally represent between 1 and 50% by mass, preferably between 1 and 40% by mass, and more specially between 2 and 30% by mass, based on the total mass of the catalyst.

Furthermore, in the context of using the vapour deposition process, the gaseous medium which contains the precursor carbon source for the nanofibres and/or nanotubes generally comprises, among other possible species, a gaseous carbon-containing species, preferably a hydrocarbon or alternatively CO, a hydrocarbon being preferred.

In addition to this carbon source the gaseous medium may advantageously comprise free hydrogen, with a $H_2/C$ molar ratio in the gaseous medium advantageously between 0.05 and 10, for example between 0.1 and 5, this ratio being preferably less than 3 and more preferably less than 1.

The gaseous medium may also contain an inert carrier gas (for example $N_2$ or He).

Typically, the gaseous medium which is used as the precursor carbon source for the nanofibres and/or nanotubes is a mixture based on hydrogen and CO or, more advantageously, a mixture containing hydrogen and a hydrocarbon, in which the hydrocarbon preferably has 1 to 6 carbon atoms ($C_1$-$C_6$ hydrocarbons), preferably between 1 and 4 carbon atoms, and more advantageously 1 or 2 carbon atoms.

Particularly advantageously the gaseous medium used comprises a mixture of hydrogen and ethane in which the hydrogen/ethane molar ratio is preferably between 0.1 and 10, and advantageously between 0.5 and 6.

According to one embodiment the gaseous medium used results from the joint delivery of a first gas flow comprising hydrogen and of second gas flow comprising the carbon source (preferably a hydrocarbon, and advantageously ethane), this carbon source being possibly diluted in a flow of inert carrier gas.

In another embodiment, the gaseous medium is introduced into the reactor in the form of a single gas flow comprising a mixture of hydrogen and a source of carbon, preferably a hydrocarbon, and advantageously ethane, which may be diluted in a flow of inert carrier gas.

Whatever the precise nature of the gaseous medium used, the flow at which the gas flow relating to the carbon source is introduced is such that the contact time between this carbon source and the catalyst is between 0.5 seconds and 60 seconds, more preferably between 1 and 30 seconds.

Furthermore the gaseous medium is typically introduced under a pressure of between $10^5$ and $10^6$ Pa, and preferably between $10^5$ and $5 \times 10^5$ Pa, for example between $10^5$ and $3 \times 10^5$ Pa.

In addition, the temperature at which the carbon nanotubes or nanofibres are grown is generally above 500° C., preferably between 500 and 1000° C. and more preferably between 550 and 700° C.

When the process according to the invention is carried out using the abovementioned vapour deposition process, the implemented confined reactor generally has an inlet and an outlet which are both equipped with means which (i) allow the gas to pass, but which (ii) hold back the solid forming within the reactor in such a way as to enable it to grow under constraint. For this purpose the inlet and outlet of the reactor may in particular be fitted with carbon felts or perforated quartz disks which allow the gas flow to pass through but hold back the nanotubes and/or nanofibres forming within the reactor.

It should be noted that, when the vapour deposition process is used in the process according to the invention, the pressure exerted on the reactor walls and on the means for confining the forming solid within the reactor is generally especially high when growth takes place under constraint. In this context it often proves advantageous to carry out the process in a reactor which resists temperature and pressure (preferably a tubular reactor advantageously with quartz walls), the inlet and outlet of which are each obstructed by a carbon felt. Use of such a reactor in fact makes it possible to obtain very high levels of pressure which make it possible to achieve particularly great solidification of the nanofibres and/or nanotubes in the material ultimately obtained.

The material as obtained according to the process of the invention which is based on tangled carbon nanotubes and/or nanofibres is an original material which has the intrinsic properties of its constituent nanotubes and/or nanofibres, but which has nevertheless a macroscopic form. This material constitutes another object of this invention, according to another aspect.

In a material such as obtained from the process according to the invention, the nanotubes and/or nanofibres typically have a diameter of between 2 and 200 nm, this diameter being generally substantially uniform over the entire length of each tubular fibre. The length of each of the fibres may vary widely, especially in relation to the dimensions of the reactor used. However, as a general rule, this length is typically between 1 and 10,000 micrometers. These dimensions may especially be determined through an analysis of electron microscope images of cross-sections of the material.

Furthermore, the BET specific surface area of a material obtained from the process according to the invention is generally of the order of that of the individual nanotubes or nanofibres. Thus the BET specific surface typically lies between 1 $m^2$/g and 1000 $m^2$/g, typically between 5 and 600 $m^2$/gram, for example between 7 and 400 $m^2$/gram. The BET specific surface area to which reference is made here is that measured by the absorption of nitrogen at the temperature of liquid nitrogen in accordance with standard NF X11-621. The materials according to the invention which are obtained by implementing aforesaid stage (c) generally have a similar BET specific surface area.

Furthermore the bulk density of a material as obtained from the process according to the invention generally lies between 0.05 and 0.80 $g/cm^3$, typically between 0.10 and 0.75 $g/cm^3$. This bulk density may be higher when aforesaid stage (c) is used.

Given the specific nature of the process according to the invention, the reactor used acts as a mould for obtaining the solid material, which takes the shape of the internal space within the reactor. The process thus makes it possible to obtain a solid based on carbon nanotubes and/or nanofibres which is capable of having a great variety of shapes, depending upon the shape of the reactor used. The shape of the solid may thus be altered by simply adjusting the shape of the reactor in relation to the envisaged application.

A material as obtained according to the invention generally includes the catalyst from which it has been synthesised. However, if desired, this catalyst may be removed by washing and/or chemical processing, in which case the material obtained essentially comprises tangled carbon nanofibres and/or nanotubes.

As far as applications for the specific material obtained from the process according to the invention is concerned, it should be noted that this material has physical and chemical properties which make it suitable for a large number of industrial applications. In this connection it may especially be used in most known applications of nanofibres and/or nanotubes, with the exception of applications requiring the use of nanofibres and/or nanotubes in the individual state.

Thus, a material such as obtained from the process according to the invention may especially be used per se as a catalyst, especially in a liquid medium for example for the catalysis of Friedel-Crafts reactions, or reactions for the desulphurisation of effluents containing $H_2S$, for example the final desulphurisation of effluents from the petroleum industry, or else for reactions wherein olefinic or aromatic compounds are hydrogenated.

Furthermore, the materials according to the invention may also be used as carrier for catalytic species. In this context the active catalytic phases can especially be coated onto the material by the impregnation of a precursor and calcination. In this context, it is preferable that the calcination should take place at a temperature of not more than 600° C., preferably less than 550° C., for example between 300 and 500° C., typically between 300 and 400° C. More generally it should be emphasised that when a material based on tangled nanofibres and/or nanotubes according to the invention is to be heat treated it is preferable to remain within the aforesaid temperature ranges in order not to degrade the material.

Furthermore, the materials according to the invention may advantageously be used to filter gaseous media containing suspended particles, for example to decontaminate contaminated atmospheres containing dusts or aerosols.

Finally the inventors have also shown that the materials based on tangled nanotubes and/or nanofibres obtained according to the invention may be used for a more specific application, namely to trap or more generally retain hydrophobic organic species. This retention generally allows the hydrophobic organic species to be adsorbed onto, and/or absorbed in, the material.

In this context work by the inventors has made it possible to establish that, by placing a material as obtained according to the invention in contact with hydrophobic species such as hydrocarbons or hydrocarbon derivatives, (for example halogenated or sulphur derivatives), an effective trapping of the said hydrophobic species by the material takes place, especially when it is based on nanotubes. In fact, it is most often nanotubes which generally prove to be more advantageous than solid nanofibres for this type of application, because of their hollow structure.

Immobilisation of the hydrophobic species on the material obtained in this context proves to be so efficient that it can effectively hold hydrophobic species even when they are initially present in an aqueous liquid medium. This possibility can especially be used for removing hydrophobic compounds present in an aqueous medium. In order to do this, it is sufficient to place the aqueous medium requiring treatment in contact with the material based on nanotubes and/or nanofibres, and then to remove the solid from the medium, for example by filtration, or more simply by manually removing it from the medium.

In this context, the invention especially relates to a process for the decontamination of an aqueous medium containing hydrophobic organic pollutants (aliphatic or aromatic hydrocarbons (benzene, toluene, polycyclic compounds), aliphatic or aromatic hydrocarbon compounds containing heteroatoms, fuels (gasoline, diesel), or dioxins, for example), comprising:

contacting the aqueous medium requiring treatment with a material as obtained according to the invention, whereby the pollutants are retained by the material, then
removing the material from the medium, thus removing the pollutants.

This process can especially be used to decontaminate wastewater or water contaminated by hydrocarbons or other hydrophobic pollutants (wastewater from oil refineries or other chemical industries, stagnant water in holding tanks, water in port areas, water in the vicinity of oil platforms, seawater contaminated by oil).

In accordance with a specific embodiment the process may be used to extract hydrophobic compounds initially present in aqueous media in trace quantities. In that case, the process advantageously comprises a preliminary step wherein a hydrophobic organic solvent is added to the medium requiring treatment before placing the medium in contact with the material according to the invention. The added hydrophobic organic solvent, which has good affinity for the organic species which have to be removed and the nanostructured material, then makes it possible to concentrate the hydrophobic species which have to be removed, which enhances their separation. In this specific case, the species are retained by the material comprising a mixture of organic solvent and the organic species which have to be removed.

It should be noted that using a material according to the invention proves to be very much more useful than materials of the activated carbon type for the purposes of holding and removing organic species.

In this respect the inventors' work has especially made it possible to establish that when hydrophobic compounds of the hydrocarbon type are contacted with a material according to the invention these hydrophobic compounds are retained by the material almost instantaneously as soon as they are placed in contact with it, whereas in the case of materials of the activated carbon type the material absorbs the hydrophobic compounds very much more slowly.

Furthermore the inventors have found that the particularly effective retention of hydrophobic species achieved with the material according to the invention proves to be reversible.

More specifically, it has been found that when a material according to the invention holding hydrophobic compounds is placed in a solvent which dissolves the said hydrophobic compounds, for example ethanol, the hydrophobic compounds migrate from the material to the solvent. In other words the materials according to the invention holding hydrophobic species may be washed out by solvents having a good affinity for these hydrophobic compounds, for example ethanol or acetone, which means that they can be recycled and subsequently reused.

This possibility of recycling is wholly unexpected in view of the results obtained when materials of the carbon type are placed in contact with hydrophobic agents. In fact, in this case, materials of the activated carbon type generally remain contaminated by the hydrophobic compounds when attempts are made to wash them out using solvents, unless burdensome and complex chemical or thermal treatments are used, which are of little advantage in terms of recycling quality/cost ratio.

These unexpected capabilities of nanostructured materials based on carbon, which allow very effective but nevertheless reversible retention of hydrophobic species, could in particular be used to extract hydrophobic compounds initially present in an aqueous medium by transferring them from the initial aqueous medium to a solvent medium such as ethanol.

In this context the invention relates especially to a process for the extraction of hydrophobic compounds initially present in an aqueous medium comprising the following successive steps:

contracting the aqueous medium containing the hydrophobic compounds requiring extraction in contact with a material according to the invention, whereby these compounds are held by the material,
removing the material containing the hydrophobic compounds from the medium, for example by filtration, or manually,
placing the solid so removed, containing the hydrophobic compounds, in a medium which dissolved the hydrophobic compounds, preferably a polar or hydrophilic solvent, for example ethanol or acetone, whereby the hydrophobic species initially held by the nanostructured material are released from the material to the solvent, with the result that ultimately the hydrophobic compounds are recovered in the said solvent, and
recovering the solvent containing the hydrophobic compounds (the solvent can be removed if it is desired to recover the hydrophobic agents as such).

This extraction process may advantageously be used for the decontamination of aqueous media containing traces of hydrophobic pollutants, such as hydrocarbons.

In this type of application the process can be used in a cyclical manner, carrying out several successive treatments on one or more polluted aqueous media and recovering the traces of pollutant in a same solvent medium, in each treatment, whereby the extracted pollutants become progressively concentrated in this specific solvent. This manner of working makes it possible to use the same extraction material recycled after each stage and also to obtain a pollutant concentration which aids their transport, storage and processing, through which the final volume of waste is particularly reduced.

The above applications of the aforesaid materials according to the invention constitute another object of this invention according to another aspect.

BRIEF DESCRIPTION OF THE DRAWING FIGURES

Other aspects and advantages of the information will be apparent from the appended Figures and the illustrative examples provided below.

FIG. 1 appended hereto is a photograph of a material according to the invention as obtained in Example 1 provided below.

DETAILED DESCRIPTION OF THE INVENTION

Examples

Example 1

Process for the Preparation of a Material Based on Tangled Nanotubes 1 g of catalyst (alumina powder containing 40% of Fe) was placed in a cylindrical tubular quartz reactor (wall thickness 4 mm, internal diameter 30 mm, length 90 mm).

Carbon felt firmly attached to the reactor by means of iron wire was fitted to each of the two inlets to the cylindrical reactor.

A gaseous flow comprising a mixture of hydrogen and ethane ($H_2/C_2H_6$ ratio 2/3) was then injected into the reactor with a total flow of 100 mL·$min^{-1}$, at a temperature of 640° C.

Growth of carbon nanotubes was then observed, and this was allowed to continue until growth took place under the constraint. The reaction was carried out for a total period of 4 hours.

In this way a solid cylindrical block based on tangled nanotubes having the shape of the internal space of the reactor was obtained.

Figure 1:
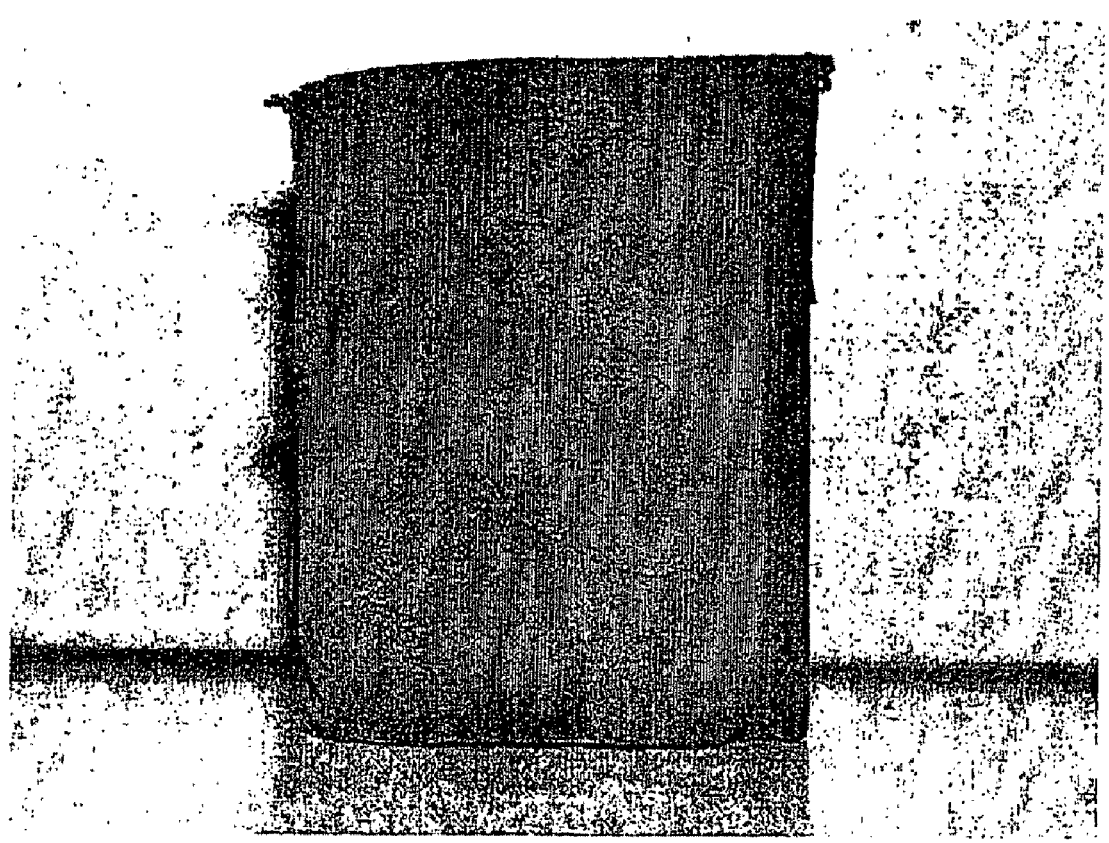
Figure 2:
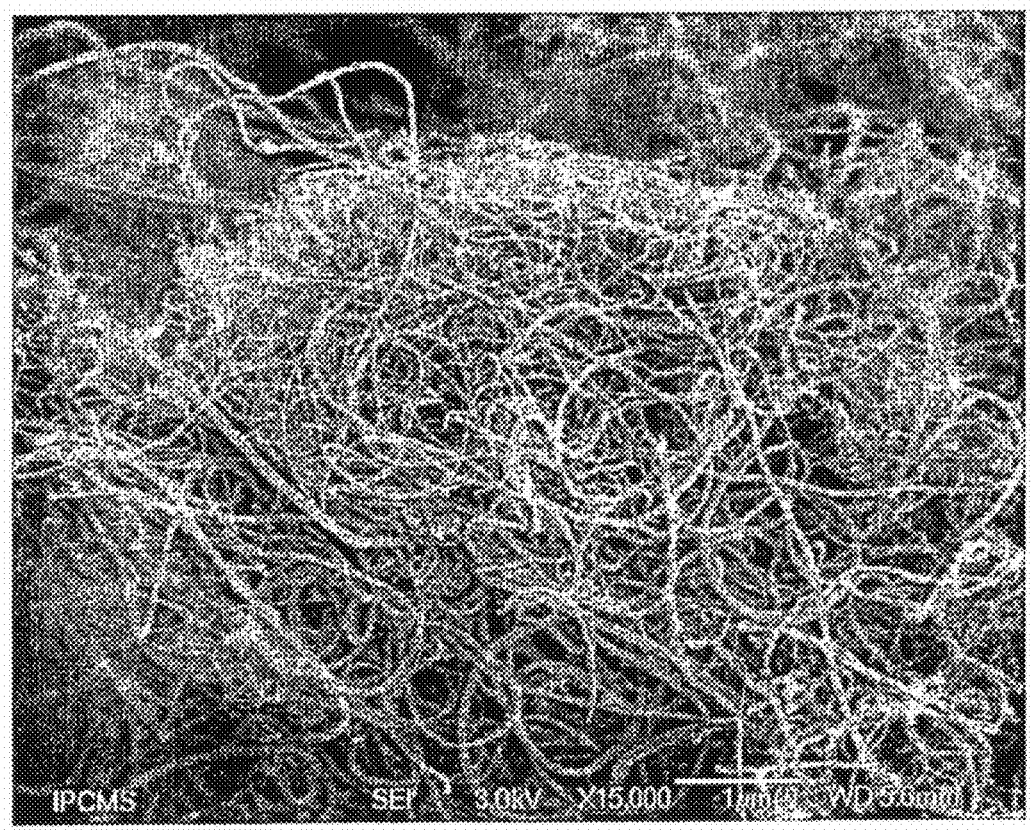
FIG. 2 is an image obtained by electron microscopy of the material in FIG. 1 (magnification: 15,000 times).

FIGS. 1 and 2 appended hereto are photographs of this material. FIG. 1 shows that macroscopically the material is a single block having the cylindrical shape of the internal volume of the reactor used. FIG. 2 illustrates the intimate structure of the material and the tangled state of the nanotubes.

The single solid cylindrical block obtained in the context of this example was removed from the cylindrical reactor using a hydraulic press. It can however also be envisaged that the solid could be extracted by wetting it with water, and then drying the material so wetted, for example under a flow of air at a temperature of the order of 50° C. Isotropic contraction of the solid would then occur, allowing easier turning out.

Example 2

Use of a Material Based on Tangled Nanotubes to Extract Organic Species Present in an Aqueous Medium 60 ml of distilled water, then 3 mL of benzene with an added fluorescent yellow dye (4,4-difluoro-1,3,5,7,8-pentamethyl-4-bora-3a,4a-diaza-S-indacene), rendering it visible, were placed in a 100 mL beaker (b1). A layer of yellow-coloured benzene on the surface of the water was obtained in this way.

The solid based on tangled nanotubes obtained in Example 1 was placed in the medium, soaking the solid in the medium. The yellow colour was immediately observed to disappear from sight, showing that the benzene was retained instantaneously.

The solid based on tangled nanotubes was then removed from the aqueous medium and placed in a beaker (b2) containing 60 ml of ethanol. It was then observed that the benzene and dye migrated towards the ethanol, which took on the yellow colour of the dye associated with the benzene.

The solid based on tangled nanotubes from which the benzene had been washed out was then removed from the ethanol, as a result of which it could be recycled for further extractions.

In order to illustrate this possibility for recycling, the solid based on tangled nanotubes washed out in this way was placed in a beaker (b3) similar to initial beaker (b1), namely one containing a 3 mL layer of coloured benzene floating on 60 mL of water. Disappearance of the yellow colour was immediately observed, showing that the recycled material retained the benzene with the same effectiveness as the initial material.

The photographs in FIGS. 3a to 3d appended hereto illustrate this example.

Figure 3A:
FIGS. 3a to 3d are a set of photographs illustrating the application of Example 2 below.

FIG. 3a shows, from left to right:
beaker (b1) containing water and the supernatant layer of coloured benzene
beaker (b2) containing ethanol
beaker (b3), similar to beaker (b1), containing water and the supernatant layer of coloured benzene.

Figure 3B:
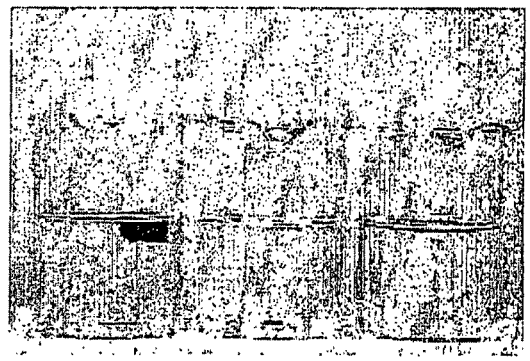
Figure 3C:
Figure 3D:

FIG. 3b is a photograph of the stage in which the solid based on tangled nanotubes was placed on the surface of the liquid medium in beaker (b1), in which it can be seen that the supernatant stage has disappeared.

FIG. 1c shows the solid based on tangled nanotubes containing carbon nanofibres which has been removed from beaker (b1) and has been plunged into beaker (b2), as a result of which the benzene and the dye migrate towards the ethanol, the ethanol being then coloured yellow.

In FIG. 1d the solid based on tangled nanotubes obtained after the washing illustrated in FIG. 1c has been placed on the surface of the liquid medium of beaker (b3), from which it can be seen that the supernatant phase has disappeared.

The invention claimed is:
1. A process for preparing a solid material based on tangled nanofibres and/or nanotubes, comprising:
growing carbon nanotubes and/or nanofibres under constraint within a confined reactor, said growing comprising the following successive steps:
(a) growing the carbon nanotubes and/or nanofibres within the confined reactor, until the nanotubes and/or nanofibres formed occupy an essential of an internal space within the reactor; and

(b) continuing growth of the nanotubes and/or nanofibres under constraint, whereby material in formation applies pressure against the reactor walls.

2. The process of claim 1, which is carried out in a reactor having quartz walls.

3. The process of claim 1, which is carried out by growing the carbon nanotubes and nanofibres by introducing a catalyst based on a transition metal in a divided state into the reactor used and injecting into the reactor a gaseous medium comprising a carbon source from which the nanotubes and/or nanofibres form on the catalyst.

4. The process of claim 3, in which the catalyst used is based on a transition metal selected from Fe, Ni, Co, Mo and mixtures of two or more of these metals.

5. The process of claim 3, wherein the catalyst is a transition metal in the form of a powder.

6. The process of claim 3, wherein the catalyst used is a transition metal in the divided state deposited on the surface of a solid carrier.

7. The process of claim 3, wherein the gaseous medium comprising the precursor carbon source for the nanofibres and/or nanotubes comprises a hydrocarbon.

8. The process of claim 3, wherein the gaseous medium comprises free hydrogen in addition to the carbon source, with an $H_2/C$ molar ratio in the gaseous medium of between 0.05 and 10.

9. The process of claim 3, wherein the gaseous medium comprising the precursor carbon source for the nanofibres and/or nanotubes is a mixture containing hydrogen and a $C_1$-$C_6$ hydrocarbon.

10. The process of claim 8, wherein the mixture of hydrogen and hydrocarbon is a mixture of hydrogen and ethane.

11. The process of claim 3, wherein the gaseous medium comprising the carbon source is introduced at a pressure of between $10^5$ and $10^6$ Pa.

12. The process of claim 3, wherein the temperature at which growth of the carbon nanotubes or nanofibres takes place is above 500° C.

13. The process of claim 3, wherein the confined reactor used has an inlet and an outlet which are both fitted with means which (i) allow the gas to pass, but which (ii) hold the solid which is in the course of being formed back within the reactor in such a way as to allow it to grow under constraint.

14. The process of claim 13, wherein the reactor inlet and outlet are fitted with carbon felts or perforated quartz disks.

15. The process of claim 1, which is carried out in a reactor of cylindrical shape, and which comprises a step (c) wherein the material obtained from growth of the nanofibres and/or nanotubes under constraint is wetted by a solvent, and then the wetted material so obtained is allowed to dry.

16. A material based on tangled carbon nanotubes and/or nanofibres, as obtained according to the process of claim 1.

17. The material of claim 16, wherein the nanotubes and/or nanofibres have a diameter of between 2 and 200 nm.

18. The material of claim 16, in which has a BET specific surface area measured by the absorption of nitrogen at the temperature of liquid nitrogen in accordance with standard NF X11-621 between 1 $m^2/g$ and 1000 $m^2/g$.

19. The material of claim 16 having a bulk density liying between 0.05 and 0.80 $g/cm^3$.

20. A method making use of the material of claim 16 as a catalyst.

21. A method making use of the material of claim 16 as a carrier for catalytic species.

22. A method making use of the material of claim 16 to hold hydrophobic organic species.

23. A process for the decontamination of an aqueous medium containing hydrophobic organic pollutants comprising:
    contracting the aqueous medium requiring treatment with a material according to claim 16, whereby the pollutants are retained by the material, then
    removing the material from the medium, thereby removing the pollutants.

24. A process for the removal of hydrophobic compounds initially present in an aqueous medium, comprising the following successive steps:
    contracting the aqueous medium containing the hydrophobic compounds which have to be removed in contact with a material according to claim 14, whereby these compounds become trapped in the material,
    removing the material containing the hydrophobic compounds from the medium,
    placing the solid so removed, containing the hydrophobic compounds, in a medium which dissolves hydrophobic agents, whereby the hydrophobic compounds are recovered in the said solvent, and
    recovering the solvent containing the hydrophobic agents.

25. The process of claim 24, which is used cyclically by applying several successive treatments to one or more polluted aqueous media and recovering the traces of pollutant in a same solvent medium in each treatment.

* * * * *